Nov. 28, 1933.   J. P. WOLFF   1,937,374
AERIAL INDICATING MEANS
Filed Oct. 7, 1929   3 Sheets-Sheet 2

INVENTOR
Joseph P. Wolff.
BY
Harness, Dickey & Pierce
ATTORNEYS.

Nov. 28, 1933. J. P. WOLFF 1,937,374
AERIAL INDICATING MEANS
Filed Oct. 7, 1929 3 Sheets-Sheet 3

INVENTOR
Joseph P. Wolff.
BY
Harness, Dickey & Pierce
ATTORNEYS.

Patented Nov. 28, 1933

1,937,374

UNITED STATES PATENT OFFICE 1,937,374

AERIAL INDICATING MEANS

Joseph P. Wolff, Detroit, Mich.

Application October 7, 1929. Serial No. 397,825

22 Claims. (Cl. 40—130)

This invention relates to indicating means for aircraft or the like, the principal object being the provision of indicating means which may be placed on or adjacent the ground, and which will be easily seen by the pilots and passengers of airplanes or other vehicles, from above.

Another object is to provide a mat-like structure adapted to form a light absorbing surface when viewed from above.

Another object is to form a mat-like structure providing a light absorbing surface and which is employed as a back-ground for lettering or other indicia.

Another object is to provide an aerial indicating device that may be employed as a landing surface for airplanes, or the like.

Another object is to provide a cellular mat so disposed relative to the ground as to produce a light absorbing surface by allowing a maximum amount of shade and shadow to be seen on the surface of the mat under direct illumination by the sun.

Another object is to provide a cellular mat producing a light absorbing surface through which snow and rain may fall leaving the walls and surface of the mat unaffected for the purpose which it is intended to serve.

Another object is to produce a cellular mat-like structure of this kind having lettering or other indicia on its upper side which has a relatively flat but roughened surface.

Another object is to provide an aerial indicating device in the form of a cellular mat consisting of sheet metal and bent to a sinuous shape and secured together to provide a cell-like structure.

Another object is to provide an aerial marker as described above that may be employed to serve its purpose during and after a snowfall without impairing its visibility.

The above being among the objects of the present invention, the same consists of certain novel features of construction and combinations of parts to be hereinafter described with reference to the accompanying drawings, and then claimed, having the above and other objects in view.

In the accompanying drawings which show a suitable embodiment of the present invention, and in which like numerals refer to like parts throughout the several different views.

Figs. 8 to 11 inclusive are fragmentary plan views showing modified forms of construction for the mat.

Figure 12:
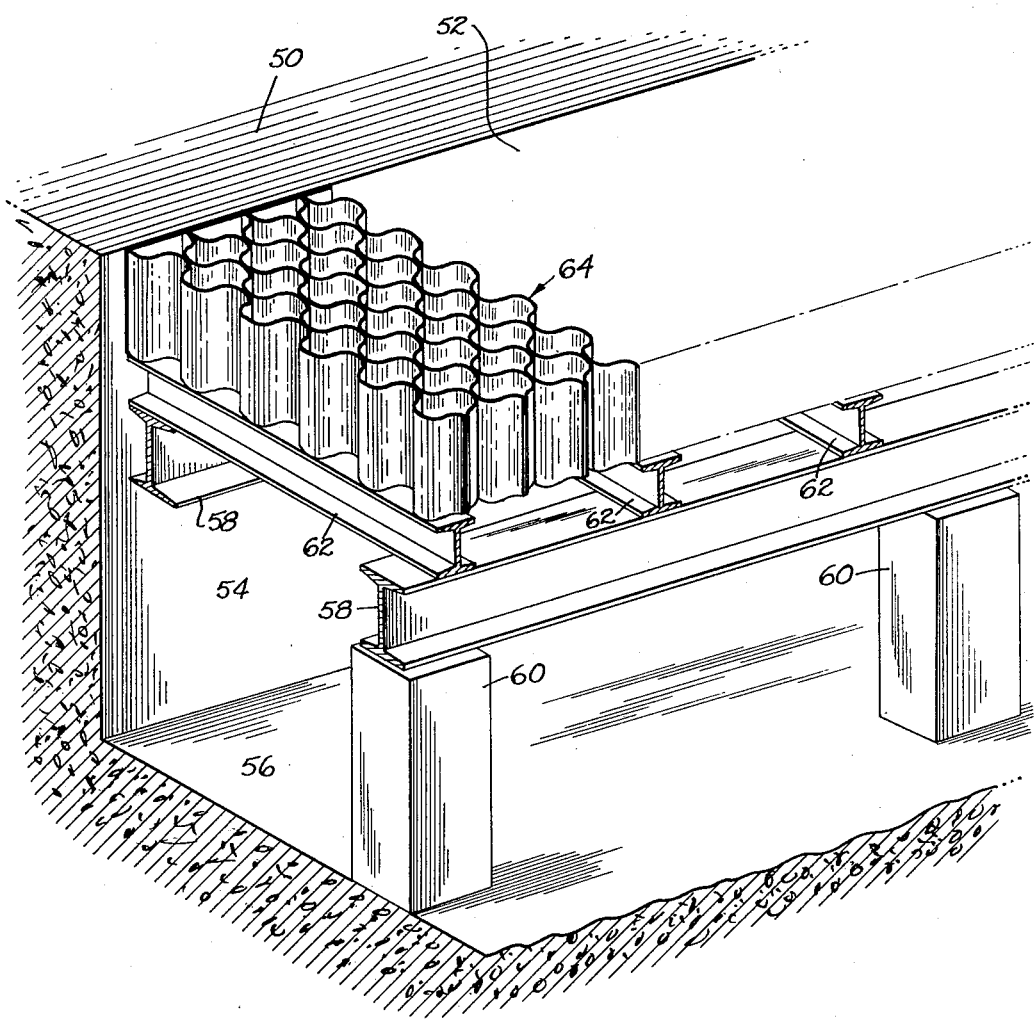

Fig. 12 is a more or less diagrammatic fragmentary partially sectioned perspective view illustrating the manner in which the present invention may be made to serve the additional function of a runway for airplane landing fields.

In the increased use of the airplane and airship for commercial purposes during the last few years, it has become increasingly important to provide indicating means on or adjacent the ground in order to permit the operators of such aircraft to more certainly and definitely determine their relative location, and this without necessitating their approach to relatively short distances from the ground. The method heretofore employed for this purpose is to form visual indications on substantially flat surfaces by means of paint or other color variations. The difference in colors of paint, pigments, dyes or any other materials which offer a natural variation in colors or tone values is, of course, readily perceived under favorable lighting conditions. But, where a comparison in contrast is made between two colors, like black and yellow, on a surface of the same texture and on the same geometrical plane, the contrast varies with the direction of light in relation to the angle of vision. In aerial observation the difference in colors on a horizontal plane becomes less marked on account of the sunlight, or the diffused light from the sky, reflecting itself from the opposite direction of the observer. Accordingly, it is the principal object of the present invention to provide a construction wherein the variation in contrast between two colors, like yellow and black, is decidedly strengthened, resulting in increased visibility regardless of the observer's angle of vision in relation to the direction of light.

Figure 1:
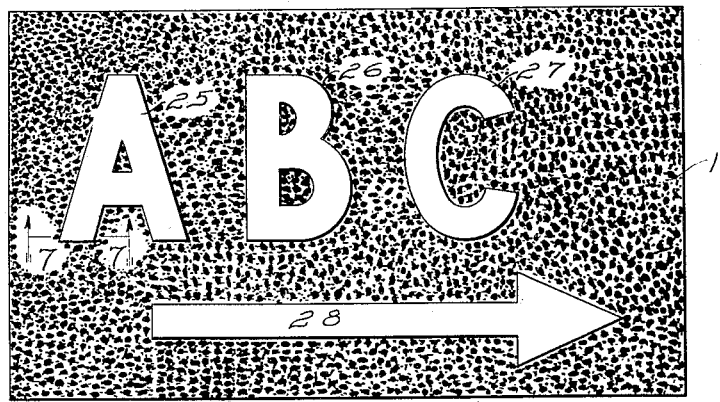
Fig. 1 is a more-or-less diagrammatic plan view of a suitable embodiment of the present invention.

Referring to Fig. 1, I show in greatly reduced plan view a suitable embodiment of the present invention comprising a mat generally indicated as at 15. This mat may be placed directly on the ground if used in a comparatively warm climate where snow-falls do not occur, or slightly above it as the occasion demands, or it may be placed on the roofs of buildings, or any other suitable place, but with its upper surface in a horizontal position where there are no vertical obstructions in the immediate vicinity to interfere with its visibility from any angle, and with its lower surface protected against entrance of light from the sides. In a climate where there is apt to be any amount of snow-fall during the winter months, the mat should be elevated to a reasonable distance above the roof or sub-floor, so as to prevent interference by an accumulation of snow.

This mat is so formed as to present a plurality of substantially vertically arranged cells, the relation of the size and shape of the various cells to their depth being such that except when the sun is substantially direct overhead, the direct rays of the sun will be intercepted by the mat between the upper and lower limits thereof, so as to prevent direct penetration. This results in a surface which is completely shaded when viewed from above and from the opposite direction of sunlight on the same vertical plane. When viewed with the direction of the sun on the same vertical plane, the mat presents a light absorbing surface which is due to the absence of a horizontal light reflecting surface.

On this mat I then place the desired indicia, preferably in the form of relatively flat surfaces which are preferably roughened to reduce excessive reflection when viewed from the side thereof opposite the sun without, however, decreasing the reflecting qualities to such extent as to reduce the contrast between the mat and the indicia when viewed from any other angle.

Figure 2:
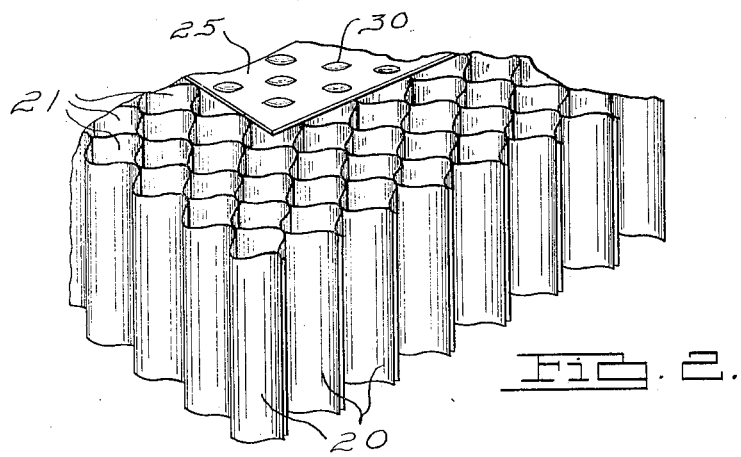
Fig. 2 is an enlarged fragmentary perspective view of a portion of the device shown in Fig. 1.
Figure 3:
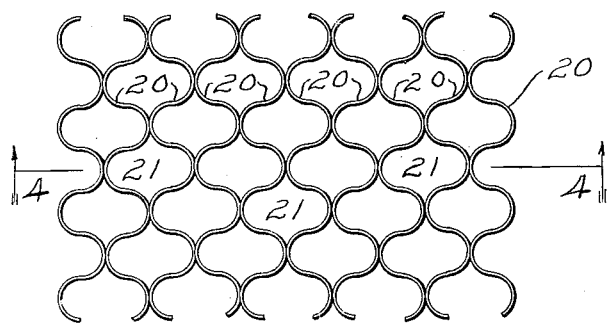
Fig. 3 is an enlarged plan view of a fragment of the mat shown in Figs. 1 and 2.
Figure 4:
Fig. 4 is a sectional view taken as on the line 4—4 of Fig. 3.

The mat itself may be formed as indicated best in Figs. 2 and 3, and as shown in these figures, the mat is made up of a plurality of sinuous sheet metal strips 20 which are joined alternately one to the other so as to produce when completed, a mat having a plurality of vertically arranged cells 21. The various strips 20 may be secured together by welding, riveting or by any other suitable means. The size of the various cells 21 thus formed by the strips 20 will depend to a large extent upon the depth of the strips 20, the exact size of the cells 20 being relatively immaterial so long as the corresponding depth is such that under normal illumination of the mat by the sun, except when the sun is substantially directly overhead, all direct rays of the sun will be intercepted by the walls of the various cells 21 between the top and bottom limits of the mat. A ratio of two and one half or more to one, between the depth and maximum transverse dimensions of the cells, will usually be sufficient. This is illustrated in Fig. 4 in which the lowest point of direct illumination of the cell walls by the sun is illustrated as at 22; this occurs on the 21st day of June (north of the equator) at about twelve o'clock noon. The result is, that except when the sun is so directly overhead as to shine down through the mat, an observer from above viewing the mat will see a non-reflecting and light-absorbing surface.

Figure 5:
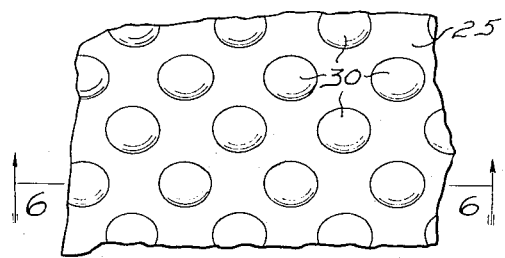
Fig. 5 is an enlarged plan view of a fragment of one of the indicia preferably employed in connection with the present invention.
Figure 6:
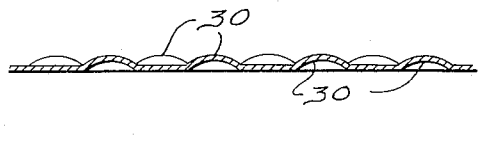
Fig. 6 is a sectional view taken as on the line 6—6 of Fig. 5.
Figure 8:
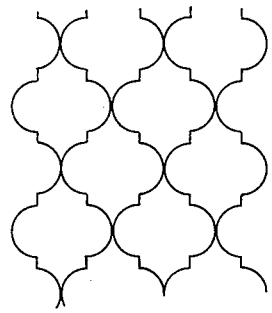
Figure 9:
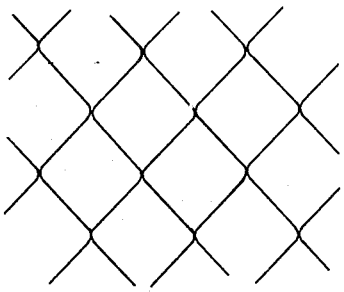
Figure 10:
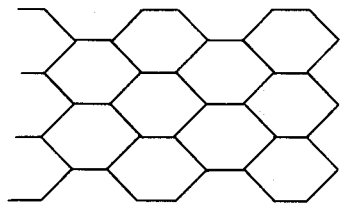

On this mat I then place the indicating means desired. This may take the form of one or more numerals, such as 25, 26 or 27, as indicated in Fig. 1, or stationary or movable arrows or other indicating means such as 28 indicated in Fig. 1. Where the letters or other indicia are to be stationary I prefer to form them of sheet metal or other sheet material cut out to the shape or design desired, and resting directly on the top of the mat. The surface of such letters or other indicating means is preferably provided with a plurality of bosses such as 30 (see Figs. 5 and 6) in order to prevent excessive light reflection when viewed from the opposite direction of the sun. Another reason for the presence of the bosses, is to increase the interception of sunlight by the bosses when the indicia is viewed from a higher or lower angle but on the same vertical plane, with the direction of sunlight. In the constant comparison of contrast between the lettering or other indicia from the various angles of aerial observation and the ever changing direction of sunlight, the bosses, due to their design, shape and form, produce a maximum contrast between the lettering and the mat. This is best illustrated in the case when the observer views the marker from a lower angle than the direction of sunlight but exactly on the same vertical plane and naturally sees no shades or shadows. The embossed surface then makes up the difference for the loss of a shadow in the surface of the mat by each boss intercepting more sunlight by virtue of its convex shape and furthermore reflecting additional diffused light from the sky on its extreme top edge or its crown from the opposite direction of the observer.

It is quite obvious that when observations are made from any other angle more shade and shadow becomes visible in the mat which automatically keys itself down in tone value to maintain a maximum contrast at all times during daylight observation between the lettering and the mat. This particular form of roughening the surface of letters is not essential to the practice of the present invention, as it will be quite obvious that the same result may be obtained by employing a sanded, gravelled or any other suitable type of surface in the place of the type shown. It is also noted that in order to produce a maximum contrast between the lettering and the mat, the top surface of the letters or other indicia should be painted or coated with a light reflecting color and the mat to be coated with a light absorbing pigment like black. The color of the paint for this use is preferably the yellow recommended in the "Report of Airway Marking Committee" published by the United States Department of Commerce under date of January 1929. The result is that with this construction an aerial marker is provided which is clearly discernible from considerable distances regardless of the observers angle of vision, and capable of being clearly read under substantially all conditions of daylight illumination.

Another important feature of the present invention is that the mat above described, where formed of sufficiently heavy material and where suitably supported, may itself be used as a landing surface for aircraft. In such a case it is preferable that the upper surface of such mat be positioned in flush relation with the surrounding ground, and that a suitable excavation be provided below the mat itself. In such a case the mat provides an ideal landing surface, particularly in winter, for in such a case any snow or rain which may fall upon the mat will pass directly through it and the upper surface will remain in constant proper condition for optimum landing conditions, without the necessity of removing snow or ice therefrom. Furthermore, in order to aid this feature, heating means may of course be provided below the mat. It will be obvious that in an installation as above described, the side walls of the excavation will form a skirt about the mat tending to shade the space below the mat, and thus increase its effectiveness.

A construction of the above described type is illustrated in Fig. 12 in which the surface of the ground is illustrated at 50, and an excavation 52 is provided in the ground and includes side walls 54 and bottom 56. Spaced I-beams 58 supported, for instance, on pillars 60 may be provided over the area of the excavation 52 and smaller I-beams 62 provided across them for directly supporting the mat 64. In such a case it is, of course, desirable that the height of the pillars 60, depth of the beams 58 and 62 and of the mat 64 be so correlated with the depth of the excavation 52 that the upper surface of the mat 64 is flush with the surface of the ground surrounding it. Where the invention is to be employed solely as an indicating means, then equivalent means may be employed for supporting the mat in spaced relation to its supporting surface.

Figure 7:
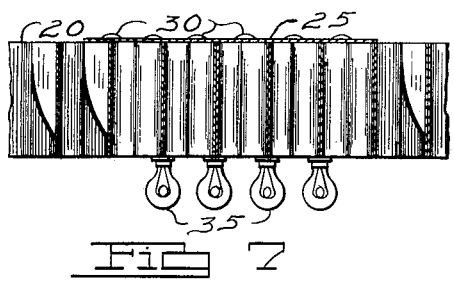
Fig. 7 is a fragmentary sectional view taken as on the line 7—7 of Fig. 1 showing a means of indirect illumination of the mat for night use allowing the lettering or other indicia to silhouette against the mat.

For the purpose of employing the device as above described for night use, I prefer to secure a plurality of electric light bulbs such as 35, or other suitable illuminating means, to the bottom of the mat. These bulbs 35 are preferably placed directly below the letters or other indicating means, as illustrated in Fig. 7, so as to protect them from view from the upper surface of the mat. The result is that at night the space below the mat is illuminated and the indicia thereon appears dark and the mat light, from above, and thus provides easy reading of the indicia without possibility of diminishing the readability of the indicia due either to direct view of the illuminating means or reflection of the light from the illuminating means into the eyes of the observer.

Figure 11:
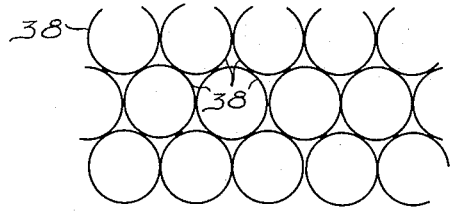

The method above described for constructing the mat may, of course, be varied in a number of different ways to affect the same result. For instance, in Figs. 8, 9 and 10 different methods of bending the metal strips and securing them together are shown. Another modification is shown in Fig. 11 in which instead of employing strips, a plurality of tubes 38 are shown arranged to affect the same result. Such changes are obvious as long as the vertical cells are so disposed as to render the same result regardless of angle of vision and direction of sunlight, and fall within the broader aspects of the present invention.

Formal changes may be made in the specific embodiment of the invention described without departing from the spirit or substance of the broad invention, the scope of which is commensurate with the appended claims.

What I claim is:

1. A device for signalling aviators in flight from the ground, comprising a cellular mat disposed to provide a shadowed surface under direct illumination by the sun and having only one end of each cell exposed to a source of light, the vertical dimensions of the cells of said mat exceeding the horizontal dimensions thereof, and visual indicating means mounted on said mat adapted to reflect rays of light from all directions.

2. A device for signalling aviators in flight from the ground, comprising a plurality of members arranged to provide a cellular structure, the cells of which are normally disposed at an angle to the rays of the sun and having only one end exposed for reception of light rays, each cell having a vertical dimension exceeding its horizontal dimension, and visual indicating means mounted on said mat adapted to reflect rays of light from all directions.

3. Aerial indicating means comprising a substantially horizontal mat composed of vertically disposed cells arranged to normally intercept between the top and bottom limits of said mat all direct rays of sunlight striking said mat and having a depth substantially two and one-half times their horizontal dimensions, and means on said mat having the outline of characters and having light reflecting properties for forming visual indications.

4. Aerial indicating means comprising a substantially horizontal mat formed of a plurality of coacting vertically disposed cells, the relation of the cross sectional area of said cells to the depth thereof being such as to intercept between the upper and lower limits of said mat substantially all of the rays of sunlight striking said mat, and means having the outline of characters on said mat, covering portions of said cells and having light reflecting properties for forming a visual indication.

5. Aerial indicating means comprising a substantially horizontal mat formed of a plurality of coacting vertically disposed cells, the relation of the cross sectional shape and area of said cells to the depth thereof being such as to produce a shadowed surface, when viewed from above and within predetermined angular positions relative to a perpendicular to said mat, under substantially all conditions of direct illumination thereof by the sun and visual indicating means mounted on said mat adapted to reflect rays of light from substantially all directions.

6. In combination, a horizontal cellular mat adapted to obstruct angularly directed rays of light for forming a shadowed surface under direct illumination from the sky when viewed from above, and visual indicating means mounted on said mat adapted to reflect rays of light from all directions.

7. In combination, a horizontal cellular mat, the depth of the cells of said mat being substantially two and one-half times the horizontal dimensions thereof, forming a shadowed surface under direct illumination from the sky by obstructing the rays of light therefrom, and visual indicating means having a substantially flat horizontal surface mounted on said mat and covering portions of some of said cells.

8. In combination, a cellular mat having vertically disposed cells adapted to obstruct the passage of light rays from the sky when viewed from above so as to form a shadowed surface, and indicating means having a substantially flat light reflecting horizontal surface mounted on said mat and covering portions of some of said cells thereby destroying the light obstructing capacities thereof and forming a sign by contrast with the uncovered cells.

9. In combination, a cellular mat having vertically disposed cells adapted to obstruct the passage of light rays from the sky when viewed from above so as to form a shadowed surface under direct illumination from the sky, and indicating means having a substantially flat horizontal surface mounted on said mat and covering portions of said cells so as to destroy the light absorbing capacities thereof, said flat surface being roughened to reduce the reflecting qualities thereof.

10. A device of the type described comprising a horizontally disposed mat formed from strips of sheet metal bent about vertical lines and coacting to form vertically disposed cells having capacity for obstructing light from the sun when viewed from above so as to present an apparently shadowed surface, and indicating members on said mat.

11. An aerial indicating mat formed from strips of metal bent to a sinuous shape and secured together to provide a plurality of vertically disposed cells each having a depth which exceeds its horizontal dimensions sufficiently to obstruct the passage of light rays from the sky when viewed from above so as to present an apparent shadowed surface, and indicating means on said mat having light reflecting properties for forming visual indications by contrast with said mat.

12. In signalling aviators in flight from the ground, the method of displaying indicia which consists in obstructing the passage of light rays from the sky through a mat so as to present a shadowed surface, and forming visual contrasting areas on said mat by destroying the light absorbing capacities of selected areas thereof.

13. In combination, a cellular mat including a plurality of cells having substantially parallel longitudinal sides and adapted to obstruct the passage of light rays from the sky when viewed from above so as to form a shadowed surface, and indicating means mounted on said mat having a light reflecting surface extending substantially normal to the sides of said cells and covering portions of some of said cells for destroying the light obstructing capacities thereof and forming a sign by contrast with the uncovered cells.

14. A device for use in connection with aviation, visible from the air, comprising, in combination, a cellular mat having vertically disposed cells adapted to obstruct the passage of light rays from the sky when viewed from above so as to form a shadowed surface, and means cooperating therewith having a surface of light reflecting characteristics whereby said combination effects a visual indicia.

15. A marker for aviation, visible from the air, comprising a body having a definite form with a top or upper surface area having large openings presenting from the air an open mesh appearance, the mesh openings being defined by walls of greater depth than the cross sectional dimensions of the individual openings to present a substantially solid wall appearance when viewed from an angle to the ground perpendicular, the said openings passing entirely through the top and bottom faces of the marker whereby falling matter may pass through and free of the marker.

16. A marker for aviation, visible from the air, comprising a body having a definite form with a top or upper surface area of open mesh, the mesh openings being defined by walls extending downwardly through the body of the marker and defining mesh openings in the top and bottom faces of the marker, and a source of night illumination arranged beneath the open mesh bottom face for illuminating the walls for view through the open mesh top face from the air.

17. A device for use in connection with aviation, visible from the air, comprising a body having a top or upper surface area having large openings presenting from the air an open mesh appearance, the mesh openings being defined by walls of greater depth than the cross sectional dimensions of the individual openings to present a substantially solid wall appearance when viewed from an angle to the ground perpendicular, the said openings passing entirely through the top and bottom faces of the marker, and means for supporting the lower face of said body in spaced relation to a surface therebelow whereby falling matter may pass through and free of the marker.

18. A device for use in connection with aviation, visible from the air, comprising a body having a top or upper surface area of open mesh, the mesh openings being defined by walls extending downwardly through the body of the device and defining mesh openings in the top and bottom faces of the device, means for supporting the body and providing a space below it and a source of night illumination arranged beneath the open mesh bottom face for illuminating the space below said walls for view through the open mesh top face from the air.

19. A device for use in connection with aviation, visible from the air, comprising a body having a top or upper surface area formed of open mesh having mesh openings each of a cross sectional dimension to freely pass wind-blown matter therethrough, said body having an open bottom for the escape of such matter, means for supporting the body and providing a space below it, and a source of illumination carried by the body for rendering the same visible at night.

20. A device for use in connection with aviation, visible from the air, comprising a body having a plurality of co-operating plates substantially perpendicular to the ground and forming an open mesh top face, the openings in the top face extending through the body and opening through the bottom face of the body, and means supporting the body with the bottom face spaced from off the ground whereby any matter passing through the openings of the body will have free escape from beneath the same.

21. A device for use in connection with aviation, visible from the air, comprising a substantially horizontally disposed body supported in spaced relation to a surface there below and having spaced side walls and a plurality of intersecting filler walls arranged between the side walls, said filler walls being arranged on edge and co-operating with each other to form a foraminous upper surface area for the body between the side walls thereof, the openings of the foraminous upper surface opening through the bottom portion of said body, and said walls being of greater depth than the cross dimension of the openings.

22. A device for use in connection with aviation, visible from the air, comprising a body having a top or upper surface area having openings presenting from the air an open mesh appearance, the mesh openings being defined by walls of greater depth than the general cross sectional dimensions of the individual openings to present a substantially solid wall appearance when viewed at an angle from above, the said openings passing entirely through the top and bottom faces of the body, means for supporting the lower face of said body in spaced relation to a surface therebelow whereby falling matter may pass through and free of the marker, and means co-operating with said body tending to shade the space therebelow.

JOSEPH P. WOLFF.